United States Patent [19]

Anderson et al.

[11] 4,019,871
[45] Apr. 26, 1977

[54] RECOMBINER APPARATUS

[75] Inventors: Robert T. Anderson, Jacksonville, Fla.; Henry L. Loy, San Jose, Calif.; William J. Nesbit, Scarborough, Maine

[73] Assignee: General Electric Company, Schenectady, N.Y.

[22] Filed: Sept. 30, 1974

[21] Appl. No.: 510,634

[52] U.S. Cl. .......................... 23/288 K; 23/288 F; 176/37
[51] Int. Cl.² ........................................ B01J 8/02
[58] Field of Search .......... 23/288 F, 288 K, 288 R

[56] References Cited

UNITED STATES PATENTS

| | | | |
|---|---|---|---|
| 2,396,190 | 3/1946 | Morgan et al. | 23/288 F UX |
| 3,159,450 | 12/1964 | Asker et al. | 23/288 F UX |
| 3,215,507 | 11/1965 | Horstmann et al. | 23/288 F |
| 3,479,144 | 11/1969 | Brose | 23/288 F |
| 3,490,878 | 1/1970 | Russell | 23/288 F |
| 3,503,716 | 3/1970 | Berger | 23/288 F UX |
| 3,567,404 | 3/1971 | Axelrod et al. | 23/288 R X |
| 3,753,662 | 8/1973 | Pagoni et al. | 23/288 K X |
| 3,771,959 | 11/1973 | Fletcher et al. | 23/288 F X |
| 3,817,716 | 6/1974 | Betz | 23/288 F |

FOREIGN PATENTS OR APPLICATIONS 1,542,293 7/1971 Germany .......................... 23/288 K

*Primary Examiner*—Morris O. Wolk
*Assistant Examiner*—Michael S. Marcus
*Attorney, Agent, or Firm*—James W. Mitchell; John F. Ahern

[57] ABSTRACT

In an off-gas recombiner for a nuclear power plant, a preheater, catalyst bed and condenser are arranged in close proximity to each other within an outer shell. Fluid communication between these components is provided by passages of short length and large cross sectional area defined by the outer shell, a semicylindrical vessel liner and a duct or transition piece. In operation, off-gas from a main power plant condenser mixed with dilution steam enters the recombiner vessel, is heated by the preheater, passed through the catalyst bed where free oxygen and hydrogen are recombined into water vapor, and cooled by the condenser where the water vapor is condensed to a liquid. The liquid is returned to the power plant feed water stream while the remaining non-condensable gases are fed to other treatment apparatus. The outer shell is insulated from the heated gases by the stream of inlet off-gas flowing through a passage defined by the outer shell and the vessel liner.

1 Claim, 3 Drawing Figures

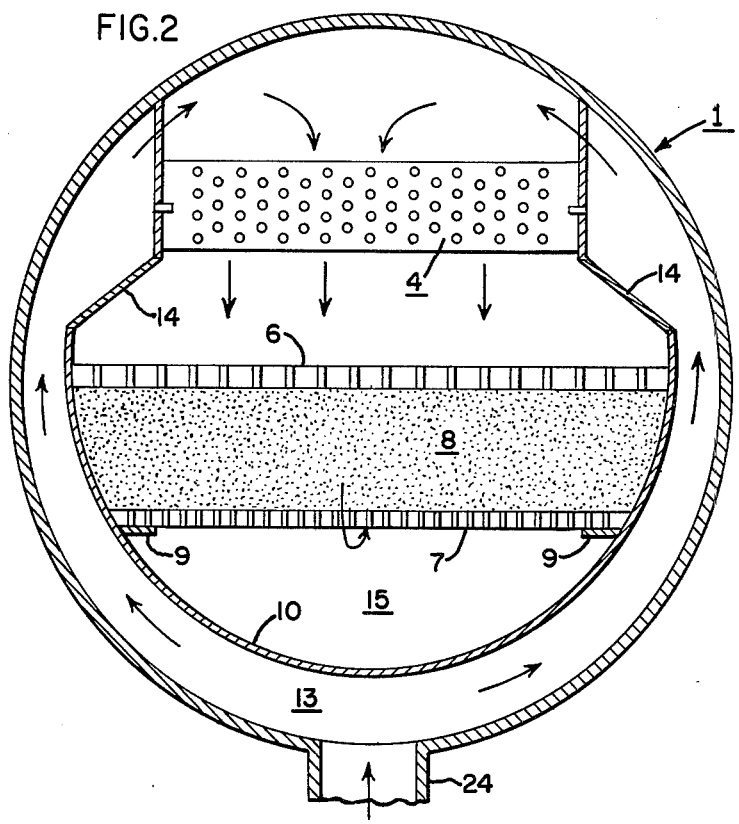
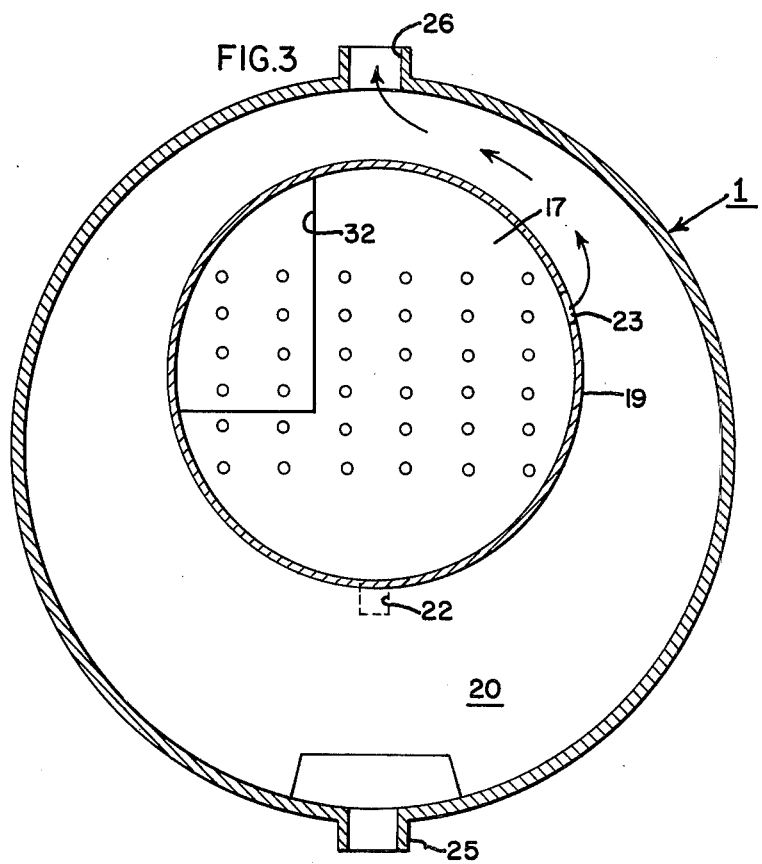

RECOMBINER APPARATUS

BACKGROUND OF THE INVENTION

This invention relates to off-gas recombiners for nuclear power plants.

In a steam turbine-generator nuclear power plant, turbine exhaust is fed to a main condenser where water vapor is condensed and returned to a nuclear reactor for reheating. Free oxygen, hydrogen and various radioactive gases are in solution with the water vapor exhaust from the turbine. "Off-gas" is that portion of the steam turbine exhaust which is not condensed and returned to the system by the main condenser.

An off-gas recombiner functions to recombine the free oxygen and hydrogen into water vapor and then condensed water, while feeding other non-condensable off-gases to other off-gas treatment apparatus employed in the power plant. To recombine the free oxygen and hydrogen, such a recombiner heats the free elements, places the free elements in contact with a suitable catalyst effecting their recombination into water vapor, and cools this resulting water vapor condensing it into a liquid.

Prior art recombiners have taken the form of a serial connection of heaters, catalysts, and condensers in fluid communication with each other through complex piping networks. These recombiners have various disadvantages associated with them. Serial connections of the recombiner components are disadvantageous in that high manufacturing costs are encountered in fabricating separate vessels for each component and providing suitable piping for the fluid communication between such individual components. In addition, such complex networks of piping results in high pressure drops contributing to a high operating cost of the off-gas recombiner. Such high manufacturing costs encountered in the provision of a plurality of vessels and suitable piping therebetween are eliminated in this invention. High operating costs associated with pressure drops within such piping networks are also eliminated with this invention.

SUMMARY OF THE INVENTION

In accordance with this invention, off-gas is fed to a single off-gas recombiner vessel in which a preheater, a catalyst bed, and a condenser are disposed. The off-gas, mixed with dilution steam, enters the vessel outer shell and flows through an arcuate path defined by the outer surface of a semicylindrical vessel liner and the inner surface of the outer shell to a preheater where it is heated. The gases then contact a suitable catalyst where the free oxygen and hydrogen are recombined into water vapor. The resulting mixture of water vapor and non-condensable gases then enters a chamber of plenum partially defined by the inner surface of the vessel liner. Thus, the inner surface of the outer shell is insulated from this relatively hot mixture of water vapor and non-condensable gas by the vessel liner and the layer of cooler incoming off-gas flowing between the vessel liner and the outer shell. From the plenum, the gases are fed to a condenser through a conduit or transition piece. Like the plenum and the other passages through which the gases have passed, the transition piece is relatively short in length but large in cross sectional area so that only minimal pressure drops in these passages are encountered. The condenser is thermally insulated from the preheater, catalyst bed and plenum by a wall means or bulkhead. In the condenser, the water vapor is condensed to a liquid and separated from the remaining non-condensable gases which are fed to various other treatment apparatus.

By employing a single vessel outer shell to contain the preheater, catalyst bed, and condenser, and arranging these components within the outer shell according to the present invention, manufacturing costs of the recombiner and fluid losses within the recombiner are reduced. Such manufacturing costs and fluid losses are also reduced by the provision of the vessel liner rather than a piping circuit for the conduction of off-gas to the preheater in that the liner is more simple in construction than a piping network and fluid losses encountered in the conduction of the off-gas through the arcuate path defined by the liner and outer shell are lower than such losses encountered in the conduction of the off-gas through a network of piping. Since the recombiner vessel outer shell is not exposed to gas heated by the preheater and therefore does not have to withstand the effects of such gases, a saving in the cost of that vessel is achieved. Therefore, it can be seen that this invention provides an apparatus for the recombination of free oxygen and hydrogen into water which is efficient, inexpensive, and simple to construct.

BRIEF DESCRIPTION OF THE DRAWINGS

FIG. 2 is a sectional view taken along line 2—2 of FIG. 1; and

FIG. 3 is a sectional view taken along line 3—3 of FIG. 1.

In accordance with the present invention, a preheater, catalyst bed, and condenser are combined in a particular manner in a recombiner as shown in FIGS. 1, 2 and 3. Referring to FIGS. 1, 2 and 3 there is shown a substantially cylindrical recombiner vessel outer shell 1 supported by structural members 2 and 3. A heat exchanger or preheater 4 comprising a bank of U-shaped tubes is disposed within the upper portion of the outer shell and extends through an aperture in one end thereof. Heating steam is fed to the preheater and condensate removed therefrom through a header 5.

Figure 1:
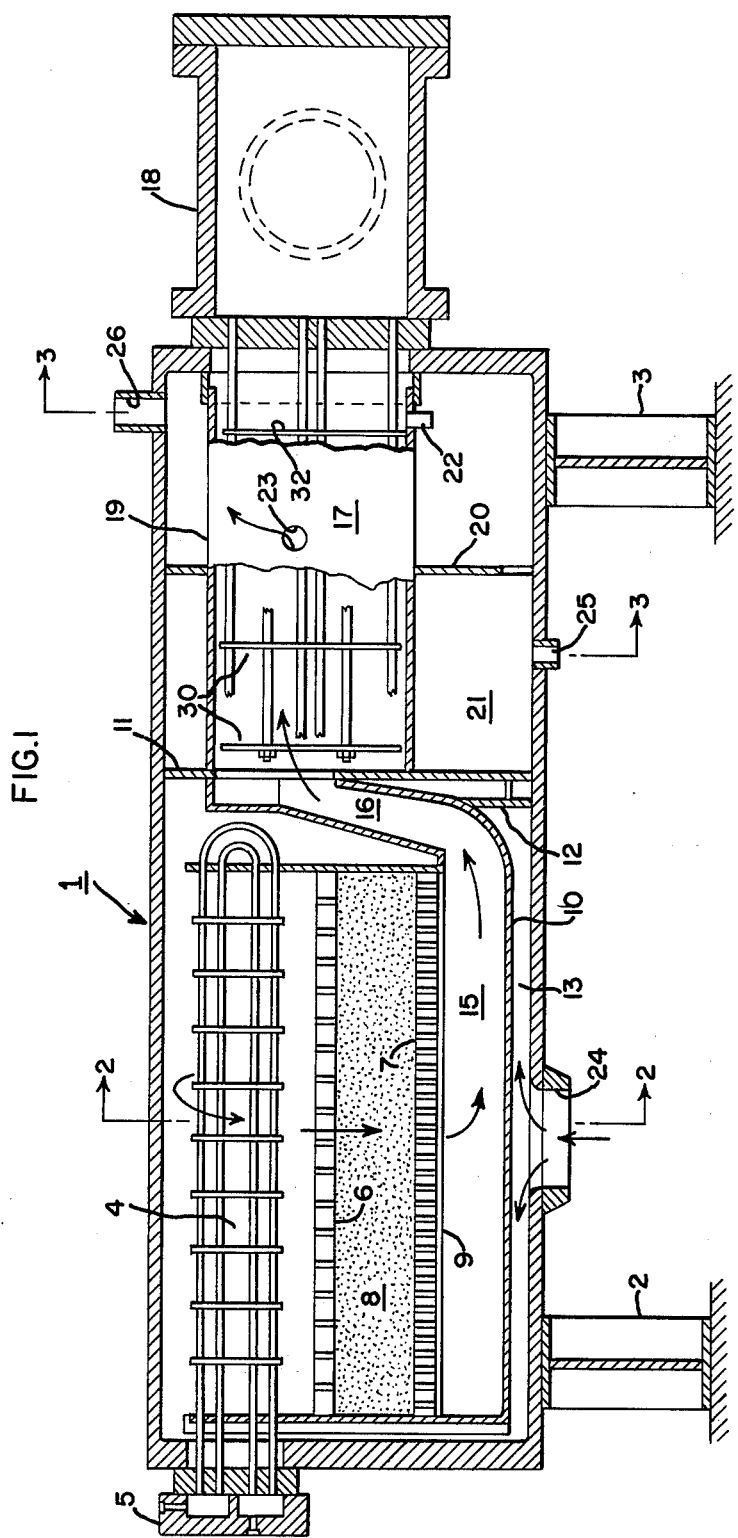
FIG. 1 is a view, partly in section, of a preferred embodiment of the invention.

Gratings 6 and 7 are disposed with the outer shell below the preheater and in fluid communication therewith. These gratings partially define a bed 8 for the containment of a recombining-reaction supporting catalyst. The lower grating 7 is slidably supported by rails 9 fixed to the inner surface of a semicylindrical vessel liner 10. These rails, cooperating with the lower grating, allow the catalyst to be readily inserted in and removed from the recombiner vessel while permitting the thermal expansion of the bed.

The semicylindrical vessel liner 10 is mounted within the outer shell, a portion of the liner disposed between the inner surface of the outer shell and the lower grating 7. This liner is fixedly attached to a wall means or bulkhead 11 and is slidably supported on a member 12. This slidable support of the liner allows the liner to expand and contract under changing thermal conditions. Referring particularly to FIGS. 1 and 2, it can be seen that the liner is spaced inwardly from the outer shell, defining therewith an arcuate passage 13. This passage functions as a path for the incoming off-gas. An arcuate passage of such a large cross section has a relatively low pressure drop associated with it. Moreover, the incoming off-gas occupying this passage acts as a thermal barrier protecting the outer shell from the effects of the heated gases issuing from the catalyst bed. Thus, the outer shell 1 may be constructed from relatively inexpensive material. Gussets 14 are fixed to the upper edge of vessel liner 10 and support the preheater 4.

The vessel liner and the lower grating define a fluid passage or plenum 15 therebetween. This plenum communicates with a conduit or transition means 16 disposed within the central portion of the outer shell and mounted therein upon the bulkhead 11. A condenser 17 comprising a series of tubes is disposed within the outer shell in fluid communication with the transition piece and extends through the opposite end of the outer shell from that through which the preheater extends. Cooling water is fed to the condenser through a header 18.

It can be seen that the arrangement of the components in such close proximity within a common outer shell makes possible the use of conduits such as the plenum, the transition piece, and the arcuate passage which have a short length relative to their large cross sectional area. Obviously such conduits have low pressure drops associated with them and thus provide efficient fluid flow within the recombiner. A substantially cylindrical condenser shell 19 is disposed without the outer shell in surrounding relationship with the condenser. This shell is fixedly attached to the bulkhead 11 and slidably supported within the outer shell by a supporting ring 20 allowing the axial expansion and contraction of the shell under changing thermal conditions. The lower portion of the condenser shell and the inner surface of the recombiner outer shell define a drain well 21 for collecting water condensed in the space defined by the condenser shell and draining therefrom through aperture 22. The remaining non-condensable gases exit the condenser shell through aperture 23 located in the side thereof. Taking FIG. 1 in combination with FIG. 3, the condenser further includes condenser tube support baffles 30 which simultaneously restrict the gas flow through the condenser and dam 32 which maintains a minimum condensate level.

In order to provide for the entrance of the non-condensable gases from a main power plant condenser, inlet 24 is provided in the lower portion of the outer shell below the vessel liner 10. Another opening 25 is provided in the lower portion of the outer shell below the condenser shell for the outlet of condensed water from the recombiner vessel. A third opening 26 is provided in the upper portion of the outer shell above the condenser shell for the outlet of the remaining non-condensable gases.

The operation of the device is as follows. Off-gas from the main power plant condenser mixed with dilution steam enters the recombiner vessel at inlet 24. As the gases impinge upon the vessel liner 10, the flow is split and forced upwardly through the arcuate space 13 defined by the vessel liner 10 and the outer shell 1. The gases flow upwardly until they reach the upper portion of the recombiner where they are directed through the preheater 4, where they are heated to a temperature sufficient to support the catalytic recombination of the free oxygen and hydrogen. As is shown in FIG. 1, after passing over the preheater, the gases, now heated, pass through the catalyst bed 8 where the free oxygen and hydrogen are recombined into water vapor. From FIG. 2, it can be seen that the outer shell is shielded from the hot gases directed through the catalyst bed both by the off-gas which has just entered the outer shell and the vessel liner 10. Since outer shell is not exposed to such high temperature gases, the cost involved in its manufacture is reduced over that involved in the manufacture of prior preheater-containing vessels. After the gases pass through the catalyst bed, they are directed through plenum 15 and transition piece 16 and are further directed over condenser 17 located within condenser shell 19. Upon passing over the condenser, the water vapor formed by the catalytic reaction and the dilution steam is condensed and drained from the condenser liner through drain 22 to drain well 21 and out of the recombiner vessel through drain 25. This water is then returned to the power plant feed water system. The remaining non-condensable gases are fed to other treating apparatus through the outlet 23 in the condenser liner and the outlet 26 in the recombiner vessel.

It can be seen that the provision of large fluid conduits such an arcuate passage 13, plenum 15, and transition piece 16 prevent high fluid pressure losses within this apparatus. In addition, the recombiner outer shell is protected from the hot gases heated by the preheater by a flow of incoming off-gas which is not yet heated. Consolidating all the recombiner apparatus within a single outer shell in the manner of this invention, and employing fluid conduits such as those described above makes possible an efficient recombiner which is low in cost and uncomplicated in operation. Further advantages of the construction according to the present invention is the regenerative heat exchange relation between the recombined gas from the catalyst bed and the incoming gas which is heated thereby further contributing to overall vessel efficiency. Moreover, the recombined gas is sealed from the incoming off-gas by the vessel liner.

Modifications of the apparatus may be made by those skilled in the art without departing from this invention and it is intended by the appended claims to cover such modifications.

What is claimed as new and desired to be secured by Letters Patent of the United States:

1. A recombiner process vessel comprising:
a horizontally disposed, substantially cylindrical outer shell having a process fluid inlet disposed therethrough in a lower portion of said outer shell;
substantially vertical wall means dividing the inner volume of said outer shell into a reaction portion and a condenser portion;
a liner disposed within said outer shell reaction portion, said liner having an arcuate portion substantially symmetric with the lower portion of said outer shell and spaced therefrom to form an annular path therebetween; said arcuate portion disposed above said process fluid inlet;
a preheater tube bundle within said liner and disposed across said arcuate portion whereby said process fluid flows from the inlet to the preheater tube bundle through the annular path formed by the outer surface of the liner and the inner surface of the outer shell;
a catalyst bed supported within the inner liner substantially enclosed by said arcuate portion below said preheater tube bundle;
a plenum formed by the lower surface of said catalyst bed and the inner surface of said liner whereby process fluid flows from said preheater tube bundle through said catalyst bed and into said plenum;

transition means interconnecting said plenum with the condenser portion through said wall means;

a substantially cylindrical condenser shell disposed within said outer shell condenser portion, said condenser shell in fluid communication with said transition means for receiving said process fluid from said plenum;

a coolant tube bundle disposed within said condenser shell;

a drain well formed by the inner surface of said outer shell, said wall means, and the outer surface of said condenser shell, said condenser shell having a drain opening therethrough; and, a gas outlet through said outer shell in fluid communication with a gas outlet through said condenser shell whereby non-condensible process fluid is removed from said process vessel.

* * * * *